United States Patent Office 3,137,461
Patented June 16, 1964

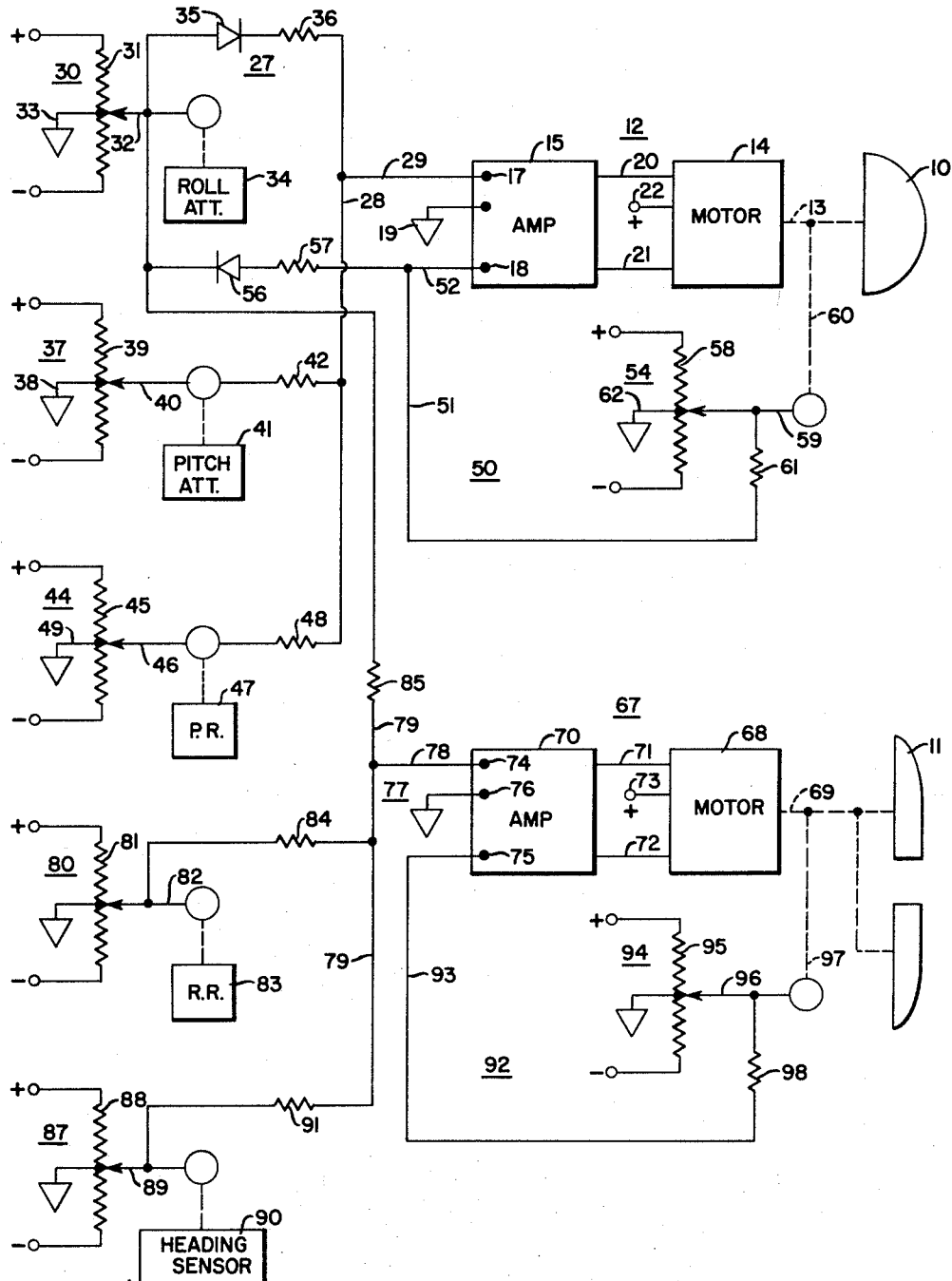

3,137,461
CONTROL APPARATUS
Daniel J. Sikorra, Champlin, Minn., assignor to Minneapolis-Honeywell Regulator Company, Minneapolis, Minn., a corporation of Delaware
Filed May 26, 1961, Ser. No. 113,010
5 Claims. (Cl. 244—77)

This invention relates to control apparatus such as automatic pilots for aircraft and more particularly to automatic pilots for preventing loss in altitude of an aircraft while in banked turn.

It is known to provide an automatic pilot so constructed that it will maintain the craft attitude in straight and level flight and wherein also the elevator control surface is operated in response to roll attitude changes of an aircraft to prevent loss of altitude while the craft is in a banked attitude.

In at least some of such prior systems, a separate source of signal in response to roll attitude changes of the aircraft will control roll attitude changing means and a second source of signal will operate the elevator surface during such roll attitude changes to prevent loss of altitude of the craft while so banked.

It is an object of this invention to provide a single signal source which will control roll attitude changing means and pitch attitude changing means of an aircraft.

It is a further object of this invention to provide a single signal source which will stabilize the aircraft about its roll axis and will also control the elevator surface or altitude changing means of an aircraft to prevent loss of altitude during changes in roll attitude.

It is a further object of this invention to provide a control signal varying in sense with the roll attitude of an aircraft in either direction from a datum and operating an elevator control surface or pitch attitude changing means unidirectionally or in but one direction from said signal.

Other objects and advantages of the invention will become apparent from the following specification, taken in connection with the accompanying drawing, wherein:

The single figure is an electrical schematic illustration of the novel control apparatus for controlling pitch attitude and roll attitude changing means of an aircraft.

According to my invention, I provide an automatic pilot system having two channels, one a pitch control channel and the other a roll control channel wherein each comprise a servomechanism for operating respectively pitch attitude and roll attitude changing means. In the roll control channel there is provided an attitude maintaining means such as a gyroscope sensing roll attitudes which furnishes a signal to stabilize the craft through the roll channel about its roll axis; this same signal is applied to the pitch channel and has the effect to counteract loss of lift during banking of the craft. This control signal may assume a sense or polarity of one or another direction relative to a datum, but means are provided in the pitch channel to operate its servomechanism unidirectionally or in but one direction irrespective of the sense of the signal.

The invention will be more fully understood by referring now to the accompanying schematic drawing in connection with a detailed description thereof.

Referring to the drawing, the control surfaces or attitude changing means 10, 11 represent conventional elevator and aileron surfaces used for controlling the movements of an aircraft about the pitch and roll axes respectively.

In the pitch channel 12, the elevator surface 10 is positioned through operating means 13 extending from an elevator servomotor 14. The servomotor 14 is reversibly controlled from an amplifier 15. The amplifier-servomotor combination 15, 14 may be similar for example to that disclosed in the patent to Ayres et al. 2,479,549, FIGURE 4 or the amplifier may be of the type disclosed in my application, Serial No. 75,762 filed December 14, 1960. Amplifier 15 comprises two separate signal input terminals 17, 18 and a virtual ground 19. The amplifier and motor are connected by amplifier output conductors 20, 21. A power transmission circuit including conductor 22 extends as an electrical input to motor 14 from a power source (not shown) which supplies D.C. voltage of required magnitude to energize motor 14 and the circuit return is through power ground. The similarity of the amplifier 15 and motor 14 herein to that in FIGURE 4 of Ayres et al. is readily appreciated.

Connected to amplifier input terminal 17 through a summing conductor 28 is a control network 27. Connected in parallel summing relation to conductor 28 is a roll attitude signal generator 30, a pitch attitude signal generator 37, and a pitch rate signal generator 44 all of network 27. Signal generator 30 comprises resistor 31 and adjustable wiper 32 which is positioned in either direction from a virtual ground 33 of resistor 31 in accordance with the roll attitude of the aircraft. The opposite ends of resistor 31 are connected to a suitable D.C. supply source. Slider 32 is connected through an asymmetrical resistance device 35 and summing resistor 36 in series to conductor 28. Signal generator 37 comprises a resistor 39 having its opposite ends connected to the D.C. supply and a wiper 40 operable in either direction from the virtual datum point 38 in accordance with the pitch attitude of an aircraft which is sensed by a position maintaining device 41 such as a vertical gyroscope. Slider 40 is connected through a summing resistor 42 to conductor 28. Signal generator 44 comprises a resistor 45 and a wiper 46. Resistor 45 has its ends connected to the D.C. supply, and wiper 46 is displaced in either direction from virtual ground 49 by a pitch rate sensing device such as a pitch rate gyroscope 47. A summing resistor 48 connects wiper 46 with conductor 28.

Connected to input terminal 18 is a network 50 comprising a summing conductor 51 and subconductor 52 extending to terminal 18. Network 50 comprises roll attitude signal generator 30 and motor displacement feedback signal generator 54. Slider 32 of signal generator 30 is connected through asymmetrical resistance device 56 and summing resistor 57 in series to summing conductor 51. Signal generator 54 comprises a resistor 58 having its opposite ends connected to the D.C. supply and includes a wiper 59 displaceable in either direction from virtual ground 62 by an operating means 60 extending from the output member 13 of servomotor 14. A summing resistor 61 extends from wiper 59 to summing conductor 51. In normal positions, the respective wipers are at the virtual centers or datum points of their respective resistors and may be displaced in either direction therefrom. When displaced in one direction from the virtual center or datum the sense of the signal on a wiper is opposite to the sense of such signal when displaced in the opposite direction from virtual center.

The asymmetrical resistance devices 35 and 56 are so arranged that a signal of one sense only will pass through device 35 while this same signal will not pass through device 56. On the other hand, when the signal is of opposite sense such signal will pass through device 56 but not through device 35. Thus while the same signal on terminals 17, 18 would cause a phase inversion on output conductors 20, 21 the present arrangement prevents this from occurring. When the signal is say of positive sense it will be applied to amplifier terminal 17 and cause rotation of motor 14 in one direction. If the signal be of the opposite sense, say negative, the signal will be applied on terminal 18 but not to terminal 17. The effect of the amplifier arrangement is such however as to cause the direction of displacement of motor 14 to be in the same direction when the negative signal is applied to terminal 18 as the direction of motor displacement when a positive signal is applied to terminal 17, in other words, amplifier 15 responds to the absolute magnitude of the control signal applied thereto.

The roll control channel 67 comprises an aileron servomotor 68 which through an output member 69 positions aileron surfaces 11. Motor 68 is controlled from an amplifier 70. The amplifier motor combination in the roll channel is similar to that provided in the pitch channel. Motor 68 is connected through conductors 71, 72 to the output side of amplifier 70. A power supply conductor 73 extends to motor 68. Amplifier 70 includes signal input terminals 74, 75 and a virtual ground or datum terminal 76. Terminal 74 is connected through a subconnector 78 to a summing conductor 79 of a network 77. Network 77 comprises roll attitude signal generator 30, roll rate signal generator 80, and heading changing signal generator 87. Signal generator 30 is connected through summing resistor 85 to conductor 79. Signal generator 80 comprises a potentiometer resistor 81 and wiper 82 which is positioned in either direction from a virtual ground of resistor 81 by a roll rate sensing device 83 which may be a conventional roll rate gyroscope. Wiper 82 is connected through summing resistor 84 to summing conductor 79. Signal generator 87 comprises a resistor 88 and adjustable wiper 89 which is positioned in either direction from the virtual ground or electrical midpoint of resistor 88 by a heading sensing device 90 such as a directional gyroscope which senses deviation in heading of the craft from a desired heading. Wiper 89 is connected through summing resistor 91 to summing conductor 79.

Amplifier input terminal 75 is connected to a summing conductor 93 of a control network 92. Network 92 comprises a follow-up signal generator 94 comprising a resistor 95 having its opposite ends connected to the D.C. supply and wiper 96 positioned in either direction from the virtual center of resistor 95 by a suitable operating means 97 connected to output member 69. A summing resistor 98 connects wiper 96 to summing conductor 93.

*Operation*

It will be understood that if a signal of one phase is supplied to terminal 17 of amplifier 15 for example, the elevator surface will move in one direction; however if this same signal is applied to terminal 18 the surface 10 will be displaced in the opposite direction. Thus if the phasing signal or its effect should be reversed such effect may be obtained by reversing the end terminal connection of its respective potentiometer resistor or by reversing the terminal of the amplifier to which the signal is applied.

We consider the more involved operation when the craft is in a banked turn. Such banked turn may be initiated by the heading sensor 90 detecting change in craft heading due to a transient disturbance and supplying a negative signal to summing conductor 79, assuming the change in heading due to the disturbance be to the right. The negative signal applied to terminal 74 causes a banking of the craft to the left and motor 68 provides a follow-up signal of negative sense from signal generator 94 which is applied to terminal 75. Vertical gyro 34 detects such change in roll attitude to the left and supplies a positive signal through summing resistor 85 through summing conductor 79 to terminal 74 causing reverse operation of motor 16 causing the aileron surfaces 11 to move toward streamlined or unoperated position. This reverse aileron movement reduces the negative feedback signal from signal generator 94, but considering the response of the motor 68 to be relatively instantaneous the net signal on terminal 74 is of the same magnitude and sense as that on terminal 75.

The signal generator 30 also through asymmetrical resistance device 35 supplies a control signal to amplifier input terminal 17 causing motor 14 to move elevator surface 10 in an upward direction. The upward displacement of the elevator surface 10 increases the angle of attack of the craft and tends to compensate for loss in lift of the aircraft due to reduction in the vertical component of the total lift vector from the wing surfaces due to roll attitude. The feedback or follow-up signal generator 54 supplies a positive voltage to terminal 18 tending to equalize the net signals on terminals 17 and 18. The pitch attitude reference 41 and the pitch rate sensing device 47 supply additional signals to summing conductor 28 to stabilize craft pitch attitude. The roll rate sensing device 83 also supplies signals to summing conductor 79 to damp oscillations in roll attitude.

As the aircraft under the influence of the left bank returns to its desired course or heading the wiper 89 of signal generator 87 is moved toward its datum point adjacent the virtual ground on resistor 88 so that the net signal on amplifier terminal 74 becomes positive and causes displacement of the aileron surfaces in the opposite direction from unoperated position to reduce the roll attitude of the craft which is followed by a reduction in the output signal from signal generator 30. The action is continuous until the aircraft again attains the desired heading.

It will be apparent that if the aircraft deviates to the left from the desired heading a similar operation is provided which in each case results in the application from the single roll attitude signal generator 30 of control signals to the pitch and yaw channels 12 and 67 respectively.

The particular arrangement shown and described is, of course, merely illustrative and it will be appreciated for example that the prevention in loss in altitude may be obtained from signal generator 30 by operating the power control means of the craft rather than the elevator surface 10 while the craft is banked. It should be therefore understood that the appended claims are intended to contemplate all such changes and modifications that fall within the sphere of my invention.

What is claimed is:

1. In control apparatus, in combination: a single source of direct current electrical signal having a positive or negative sense relative to a datum; an amplifier means having two direct current signal receiving input terminals and a third terminal corresponding to the datum and said amplifier means providing an output of opposite sense when the same signal is alternatively applied to one signal input terminal compared with the output when the same signal is applied to the other signal input terminal; unidirectional conducting means connecting the signal source to one input terminal to provide a net output of one sense relative to the datum; additional unidirectional conducting means connecting the signal source to the other input terminal to provide a net output of the same sense relative to the datum; wherein the first-named unidirectional means and additional means each comprise an asymmetrical resistance means one oppositely disposed from the other, for transmitting a signal of only one sense from the signal source to one signal input terminal and only transmitting a signal of the other sense from the source to the other input terminal.

2. The apparatus of claim 1, servo means controlled by the amplifier output and operated in only one direction irrespective of the sense of a signal from the signal source relative to the datum and feedback direct current signal producing means connected to one of said two amplifier signal input terminals.

3. The apparatus of claim 1 and attitude maintaining means responsive to roll attitude of the aircraft operating said signal source relative to datum to develop a signal in accordance with the direction of roll of the craft.

4. Flight control apparatus for an aircraft comprising attitude means sensing tilt of the aircraft about its lateral and longitudinal axes; means including a reversible polarity direct current voltage signal providing device operable from a normal position in one or the other of two directions in accordance with the craft attitude change about the lateral axis by said attitude responsive means; a second reversible polarity direct current voltage signal providing device operable from a normal position in one or the other of two directions in accordance with movement of said attitude responsive means about the longitudinal axis; elevator power means including an amplifier having two input terminals and a ground terminal; means connecting the first signal device responsive to lateral axis changes to one input terminal thereof and further means connecting said second signal device responsive to longitudinal axes changes to both input terminals of said amplifier, said further means including means for supplying signals from the second device of one polarity to but one input terminal and supplying signals of the other polarity to the other input terminal, whereby said elevator surface is moved in one direction irrespective of the direction of craft tilt about the longitudinal axis but in either direction in accordance with craft tilt about the lateral axis.

5. Control apparatus for a banked aircraft comprising: control means providing a direct current signal of varying magnitude and reversible polarity depending upon the direction of bank of the craft from a datum; an amplifier having two input terminals; parallel unidirectional conducting connections from said control means to said two terminals each parallel comprising a device such as a rectifier having a higher impedance to passage of current in one direction than the other so that signals of one polarity from the control means are applied to one terminal only and signals of opposite polarity are applied to the other terminal only; servo means controlled by said amplifier; means operated by said servo means to oppose loss in altitude of the craft while said craft is so banked; and means responsive to change in pitch attitude of the craft in either direction and connected to one of said two terminals and supplying thereto a direct current signal of a reversible polarity for reversibly controlling said servo means.

References Cited in the file of this patent
UNITED STATES PATENTS

| | | |
|---|---|---|
| 2,488,448 | Townes | Nov. 15, 1949 |
| 2,531,188 | Yates | Nov. 21, 1950 |
| 2,740,082 | Sedgfield | Mar. 27, 1956 |
| 2,883,128 | Kerpchar | Apr. 21, 1959 |
| 2,997,660 | Young | Aug. 22, 1961 |
| 2,999,975 | Pinkley | Sept. 12, 1961 |